United States Patent
Boehm et al.

(10) Patent No.: US 11,040,426 B2
(45) Date of Patent: Jun. 22, 2021

(54) MACHINE TOOL HAVING A TOOL SPINDLE AND A LOADING PORTAL

(71) Applicant: STAMA Maschinenfabrik GmbH, Schlierbach (DE)

(72) Inventors: Thomas Boehm, Eislingen (DE); Christoph Peschke, Ebersbach an der Fils (DE); Florian Letsch, Pluederhausen (DE); Frank Mueller, Stuttgart (DE)

(73) Assignee: STAMA Maschinenfabrik GmbH, Schlierbach (DE)

( * ) Notice: Subject to any disclaimer, the term of this patent is extended or adjusted under 35 U.S.C. 154(b) by 0 days.

(21) Appl. No.: 16/700,296

(22) Filed: Dec. 2, 2019

(65) Prior Publication Data

US 2020/0180096 A1 Jun. 11, 2020

(30) Foreign Application Priority Data

Dec. 5, 2018 (DE) ...................... 10 2018 130 925.2

(51) Int. Cl.
*B23Q 39/02* (2006.01)
*B23Q 1/01* (2006.01)
(Continued)

(52) U.S. Cl.
CPC ........... *B23Q 39/022* (2013.01); *B23Q 1/012* (2013.01); *B23Q 1/26* (2013.01); *B23Q 3/15706* (2013.01);
(Continued)

(58) Field of Classification Search
CPC .......... B23Q 1/012; B23Q 1/015; B23Q 1/26; B23Q 2707/04; B23Q 39/022;
(Continued)

(56) References Cited

U.S. PATENT DOCUMENTS 3,825,245 A * 7/1974 Osburn ................ B23Q 7/1431
269/30
4,480,738 A * 11/1984 Mattson ............... B23Q 7/1431
198/346.1
(Continued)

FOREIGN PATENT DOCUMENTS

DE 102016121200 A1 5/2018
EP 1834719 A1 9/2007
(Continued)

OTHER PUBLICATIONS

Extended European Search Report for European Application No. 19213011.0, dated May 7, 2020.

*Primary Examiner* — Nicole N Ramos
(74) *Attorney, Agent, or Firm* — Jason H. Vick; Sheridan Ross, PC

(57) ABSTRACT

A machine tool is provided with a vertically aligned tool spindle, which is equipped for accommodating tools and which is movable in a vertical direction and in a first horizontal direction. The machine tool further comprises at least one jig for clamping workpieces to be machined. The at least one jig is movable in a second horizontal direction. The tool spindle and the at least one jig are arranged on a common machine frame. There is also provided a workpiece transport device, which is arranged on the machine frame, and which is adapted to perform at least one of introducing unmachined workpieces into the at least one jig and removing machined workpieces from the at least one jig. There is also provided a corresponding method of machining workpieces.

14 Claims, 5 Drawing Sheets

(51) Int. Cl.
*B23Q 7/04* (2006.01)
*B23Q 1/26* (2006.01)
*B23Q 3/157* (2006.01)

(52) U.S. Cl.
CPC ............. *B23Q 7/046* (2013.01); *B23Q 7/048* (2013.01); *B23Q 2707/04* (2013.01)

(58) Field of Classification Search
CPC .. B23Q 39/028; B23Q 39/15706; B23Q 7/04; B23Q 7/046; B23Q 7/048
See application file for complete search history.

(56) References Cited

U.S. PATENT DOCUMENTS

| | | | | |
|---|---|---|---|---|
| 4,644,635 | A * | 2/1987 | Murai | B23Q 1/54 269/71 |
| 4,809,422 | A * | 3/1989 | Kitamura | B23Q 1/4857 483/14 |
| 5,172,464 | A * | 12/1992 | Kitamura | B23Q 1/5406 198/346.1 |
| 5,688,084 | A * | 11/1997 | Fritz | B23Q 1/03 310/13 |
| 7,013,544 | B2 * | 3/2006 | Yasuda | B23Q 7/1431 29/27 C |
| 7,367,929 | B2 | 5/2008 | Feinauer et al. | |
| 7,422,510 | B2 * | 9/2008 | Schneider | B24B 27/0061 451/10 |
| 7,621,031 | B2 * | 11/2009 | Kawai | B23Q 1/4852 198/346.1 |
| 7,726,219 | B2 * | 6/2010 | Conen | B23B 3/161 82/124 |
| 8,505,894 | B2 * | 8/2013 | Takahashi | B23Q 1/66 269/55 |
| 8,640,313 | B2 * | 2/2014 | Horn | B23Q 7/1431 29/33 P |
| 8,833,540 | B2 * | 9/2014 | Amaya | B23Q 7/045 198/346.1 |
| 2002/0006764 | A1 * | 1/2002 | Hanisch | B23Q 1/52 451/1 |
| 2004/0047700 | A1 * | 3/2004 | Maeda | B23Q 11/0057 409/134 |
| 2010/0313718 | A1 * | 12/2010 | Meidar | B23Q 1/012 82/122 |
| 2011/0070044 | A1 * | 3/2011 | Kawada | B23Q 1/488 409/162 |

FOREIGN PATENT DOCUMENTS

| | | |
|---|---|---|
| EP | 2283966 A1 | 2/2011 |
| EP | 2394779 A1 | 12/2011 |
| WO | WO 2005/005098 | 1/2005 |
| WO | WO 2014/188600 A1 | 11/2014 |
| WO | WO 2018/172061 | 9/2018 |

* cited by examiner

MACHINE TOOL HAVING A TOOL SPINDLE AND A LOADING PORTAL

CROSS-REFERENCE TO RELATED APPLICATIONS

This application claims priority to German patent application 10 2018 130 925.2, filed on Dec. 5, 2018. The entire content of that priority application is fully incorporated by reference herewith.

BACKGROUND

The present disclosure generally relates to machine tools. More specifically, in certain embodiments, the present disclosure relates to flexible machine tools that are capable of multi-side machining. In certain embodiments, the present disclosure relates to transfer devices for loading/unloading workpieces. In certain embodiments, the present disclosure also relates to a corresponding method for machining workpieces.

Further, in certain embodiments, the present disclosure relates to a machine tool, comprising at least one vertically aligned tool spindle that is equipped to accommodate tools, which spindle is movable in a vertical direction and in a first horizontal direction orthogonal to the vertical direction, and comprising at least one jig for clamping workpieces to be machined, the jig being movable in a second horizontal direction orthogonal to the first horizontal direction, wherein the tool spindle and the jig are arranged on a common machine frame, and wherein the machine tool further comprises a workpiece transport device.

A similar machine tool is known from International Patent Application, publication number WO 2018/172061 A1, which stems from the same applicant. The entire content of that application is fully incorporated by reference herewith.

This machine tool comprises two stationary portal beams facing each other in a common working zone, on each of which a tool spindle can be moved vertically, in the Z-direction, and along the portal beam in a first horizontal direction, the X-direction. Between the portal beams there are two jigs, one for each tool spindle, for clamping workpieces to be machined, which are movable on a common pair of guide rails in the second horizontal direction, the Y-direction.

Two tool magazines for each tool spindle project laterally into the working zone. Tools are changed from the tool spindles in accordance with the pick-up process at the lower tool magazine. Tools can be transferred between the upper and lower tool magazines by means of transfer devices.

Workpieces to be machined are inserted into the first jig under a portal beam, partly machined there with the first tool spindle, transferred to the second jig, finished there with the second tool spindle, and then unloaded from the working zone again with the second jig under the second portal beam.

The two jigs are therefore not only required during the machining of the workpieces, but also for the loading and unloading of the workpieces, i.e. for the entire through-transfer process.

The machine tool according to WO 2018/172061 A1 enables machining of a wide range of workpieces with a large number of tools, whereby the workpieces are transferred from one jig to the other for complete machining.

However, this machine tool may be considered too complex for certain applications, whereas it requires a relatively large footprint and a relatively long machining time, at least for certain workpieces.

In International Patent Application, publication no. WO 2005/005098 A1, which stems from the same applicant, there is disclosed a machine tool having two moving columns, each carrying two workpiece spindles between which there is a common working space. The entire content of that application is fully incorporated by reference herewith.

Workpieces are transported into and out of the working zone by means of a loading portal. The loading portal has two posts standing on the hall floor next to the machine tool, which posts are connected at their upper ends to a beam running in the X-direction, on which a gripper unit is moved in the Z- and X-direction, which has a workpiece gripper at its lower end.

The drawbacks of this machine tool include, for instance, the relatively large footprint and the relatively poor accessibility of the machining zone due to the loading portal.

In view of this, it is an object of the present disclosure to further refine the general concept of the machine tools briefly mentioned at the outset.

It is a further object of the present disclosure to present a machine tool design concept that addresses at least some of the above-indicated drawbacks.

It is a further object of the present disclosure to present a machine tool that has a compact design.

It is a further object of the present disclosure to present a machine tool that has is simpler in design than other machine tools, while providing similar or even improved performance.

It is a further object of the present disclosure to present a machine tool that requires only a small footprint.

It is a further object of the present disclosure to present a machine tool that enables fast workpiece machining while providing good accessibility of the working zone.

It is a further object of the present disclosure to present a machine tool that is flexible to use.

It is a further object of the present disclosure to present approaches to the loading/unloading procedure for workpieces, which may contribute to the overall reduction of the processing time.

It is a yet further object of the present disclosure to present a corresponding processing method that addresses the loading/unloading procedure.

SUMMARY

In regard of the machine tool, these and other objects are achieved by a machine tool, comprising:
- at least one vertically aligned tool spindle,
- a jig for supporting workpieces to be machined,
- a machine frame that supports the tool spindle and the jig, and
- a workpiece transport device,
- wherein the at least one tool spindle is configured to accommodate tools,
- wherein the at least one tool spindle is movable in a vertical direction and in a first horizontal direction orthogonal to the vertical direction,
- wherein the jig is movable in a second horizontal direction orthogonal to the first horizontal direction,
- wherein the workpiece transport device is arranged on the machine frame, and
- wherein the workpiece transport device is adapted to perform at least one of introducing unmachined workpieces into the jig and removing machined workpieces from the jig.

This aspect is based on the insight that in many cases the use of jigs to guide workpieces through the machine is impractical and slow, because the jigs have to perform two tasks, so to say, namely on the one hand holding the workpieces during the machining operation and on the other hand transporting the unmachined and/or machined workpiece.

It has been observed that machining with one tool spindle is sufficient for many workpieces.

As used herein, a jig may also be referred to as a fixture. A jig is a holding and clamping device which is capable of holding and clamping workpieces during machining. This involves, in certain embodiments, also holding and clamping workpieces prior to the machining and subsequent to the machining, at least for a short amount of time. Hence, a jig provides, so to say, an interface between the workpiece and the structure of the machine tool. Generally, the jig is adapted to the geometry of the workpiece and to the intended machining operation(s). A jig may be coupled with a rotary/pivot drive to provide at least one (additional) degree of freedom of movement.

In certain embodiments, the machine tool has a compact design and requires a small footprint because it comprises only one tool spindle and one or two jigs, as well as a workpiece transport device mounted on the machine frame, which workpiece transport device is designed to introduce unmachined workpieces into the jig and/or remove machined workpieces from the jig.

The transport of the workpieces by means of the specifically adapted workpiece transport device can be carried out faster than with the jigs, so that the overall machining time for certain workpieces is shorter than with the machine tool described in WO 2018/172061 A1, at least in certain embodiments.

In certain embodiments, the workpiece transport device only takes over the transport into or out of the jig, namely if the transport of the unmachined workpieces into the jig or the machined workpieces out of the jig takes place as described in WO 2018/172061 A1 mentioned at the outset. The unmachined workpieces can also be fed by a bar feeder.

In an exemplary embodiment, a fixed portal beam extending in the first horizontal direction is arranged on the machine frame, on which portal beam the tool spindle is mounted so that it can move in the vertical and the first horizontal direction.

As a result, the machine tool may be relatively compact and rigid, which enables the workpieces to be machined quickly, at least in certain embodiments.

In certain embodiments of the machine tool, no more than one tool spindle is provided, wherein one or two jigs are provided.

In certain embodiments of the machine tool, the workpiece transport device is adapted to perform both introducing unmachined workpieces into the jig and removing machined workpieces from the jig.

In an exemplary embodiment, two jigs that are movable in the second horizontal direction are arranged on the machine frame. In an exemplary embodiment, a guide extending in the second horizontal direction, on which the two jigs are mounted, is arranged on the machine frame.

Because the machine tool has two jigs for clamping workpieces, the workpieces can be transferred between the jigs so that even complex workpieces can be quickly finished in the machine tool, at least in certain embodiments.

The transfer of workpieces from one jig to the other can take place, for example, by means of a spindle gripper clamped in the tool spindle or via the workpiece transport device.

Since both jigs are arranged on the same guide, in certain embodiments, the structure of the machine tool is compact and simple, at least in certain embodiments.

In the alternative, it is also possible to arrange at least one of the two jigs to pivot about a horizontal axis, in certain embodiments. The horizontal axis extends in the first horizontal direction, in certain embodiments.

In certain embodiments, the workpiece may be transferred directly from the first to the second jig, which enables rapid machining of the workpieces.

A further result is that a workpiece clamped in the jig can be machined on all sides and surface areas that are not clamped in the jig. This allows a complete quick machining of a workpiece in the machine tool, at least in certain embodiments.

In certain embodiments, at least one stationary tool magazine is provided for a tool change in accordance with the pick-up process. Hence, in certain embodiments, the tool magazine as a whole is not moved when the machine tool is operated for machining workpieces and also for exchanging tools between the tool spindle and the tool magazine. Needless to say, within the stationary tool magazine, there may be drives and other mechanisms, e.g. a tool chain, to move the tools for loading/unloading.

In certain embodiments, a tool change is possible basically at any time. It is not necessary that the tool magazine has first to be moved into the working zone. This also ensures a short overall machining time for a workpiece. For the tool change, the tool spindle moves out of the working zone by opening a door, if necessary, in the cladding wall that separates the inner end of the tool magazine from the working zone.

As already known from the WO 2018/172061 A1 mentioned at the beginning, also in the machine tool according to the present disclosure a further tool magazine can be arranged above the tool magazine, wherein a reloading device can be provided in order to transfer tools between the tool change magazine and the tool storage magazine arranged thereabove.

Hence, in certain embodiments, the number of available tools can be further increased, which may further increase the flexibility of the workpiece machining procedure.

The tool spindle only has to move to the tool magazine arranged further below. This means that the tool spindle only has to perform short strokes in the vertical and horizontal directions in order to change tools and then to approach the workpiece again. These "short Z and Y axes" not only enable a very rigid and compact design of the machine tool, at least in certain embodiments. They may also allow a short chip-to-chip time, which in turn enables fast machining of the workpieces, at least in certain embodiments.

In an exemplary embodiment, the workpiece transport device comprises a beam which extends in the second horizontal direction, and on which there is mounted at least one gripper unit, which is movable in the second horizontal direction, and which comprises a workpiece gripper which is mounted so as to be movable in the vertical direction. In certain embodiments, a second gripper unit is mounted on the beam, which second gripper unit is movable in the second horizontal direction, and which has a workpiece gripper which is mounted so as to be movable in the vertical direction.

This workpiece transport device enables fast loading and unloading of the jigs. While one gripper unit carries an unmachined workpiece, the other can remove a machined workpiece from a jig. If only one jig is provided, the previously machined workpiece is first removed from this jig before the next workpiece to be machined is inserted without long travel distances, i.e. quick loading/unloading is possible.

If two jigs are provided, removal and insertion (unloading and loading) can take place simultaneously or nearly simultaneously, which further reduces the overall machining time for a workpiece.

In certain embodiments, the beam is supported by at least one post on the machine frame. In certain embodiments, the beam is also the supported by at least one post in the second horizontal direction next to the machine frame.

As a result, the loading portal formed in this way does not necessarily extend in the X- but in the Y-direction, so that the working zone remains accessible from the side. In certain embodiments, the second post is not necessary, so that as a result the machine tool is also short in the Y-direction.

In regard of the method, the above and other objects are achieved by a method of machining a workpiece, the method comprising the steps of:

a) Gripping an unmachined workpiece with a workpiece gripper, inserting the workpiece into a first jig, and clamping the workpiece in the first jig,
b) Machining the workpiece with tools clamped in a tool spindle, and
c) Removal and depositing of the finished workpiece with the workpiece gripper.

At least in certain embodiments, the method makes use of at least one embodiment of the machine tool as described herein.

In an exemplary embodiment, in step b) the workpiece clamped in the first jig is transferred after a partial machining to a second jig where it is clamped and finished, and/or in step b) the workpiece clamped in the first jig is transferred by means of the workpiece gripper to the second jig, and/or in step b) the workpiece clamped in the first jig is transferred directly to the second jig, for which purpose the two jigs are pivoted about an axis extending in a horizontal direction and move towards one another in a second horizontal axis.

In certain embodiments, if two workpiece grippers are used, in step c) the finished workpiece is removed from the second jig with one of the two workpiece grippers and an unmachined workpiece is inserted into the first jig with the other of the two workpiece grippers, and then one workpiece gripper deposits the machined workpiece and the other workpiece gripper receives an unmachined workpiece.

As used herein, the term finished indicates that a workpiece has been machined up to a final state in the particular machine tool (in terms of the process intended to be performed by the machine tool). Hence, the terms finished or finishing are not to be construed to be limiting. Further machining or other procedures may be performed on the workpiece, for instance by further additional machine tools.

In regard of the method, in accordance with another aspect of the present disclosure, the above and other objects are achieved by a method of machining a workpiece, the method comprising the steps of:

providing a machine tool in accordance with at least one embodiment as disclosed herein,
gripping an unmachined workpiece with a workpiece gripper of the workpiece transport device, introducing the workpiece into a first jig, and clamping the workpiece in the first jig,
machining the workpiece with tools that are clamped in the tool spindle, and
removing the finished workpiece with the workpiece gripper.

The method steps as described herein, taken individually but also in combination, lead to a fast workpiece change and thus to a short processing time, as already described above in connection with the corresponding features.

It is to be understood that the previously mentioned features and the features mentioned in the following may not only be used in a certain combination, but also in other combinations or as isolated features without leaving the spirit and scope of the present disclosure.

BRIEF DESCRIPTION OF THE DRAWINGS

Further features and advantages of the disclosure are disclosed by the following description of a plurality of exemplary embodiments, with reference to the drawings, wherein.

EMBODIMENTS

Figure 1:
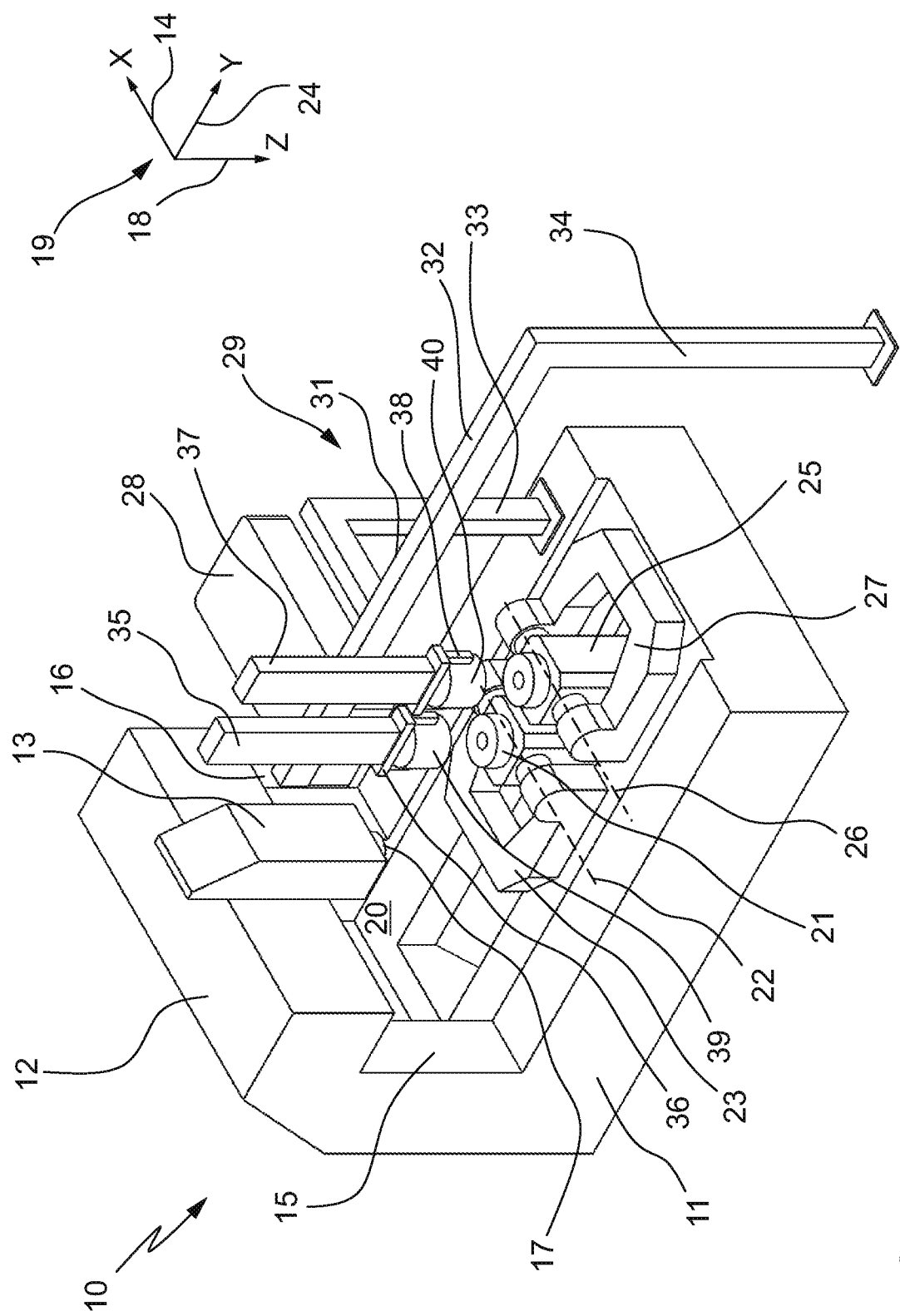
FIG. 1 is a perspective, schematic illustration of an exemplary embodiment of a machine tool.

FIG. 1 shows, in a perspective view that is not necessarily true to scale, a machine tool 10, which comprises a machine frame 11. The individual components of the machine tool 10 are only schematically indicated, because it is not necessarily the specific design and implementation, but the general arrangement and interaction that contribute to the advantages achieved with the machine tool 10, at least according to certain exemplary embodiments.

A portal beam 12 is arranged above the machine frame 11 and carries a spindle head 13, which can be moved along the portal beam 12 in a first horizontal direction 14, the X-direction.

From the machine frame 11 there are two posts 15, 16 extending upward, at whose upper ends the portal beam 12 is arranged. Machine frame 11, posts 15, 16 and portal beams 12 are either integrally designed as one piece or are manufactured as separate components and subsequently firmly attached to each other, e.g. glued together or otherwise bonded.

The spindle head 13 supports a rotating tool spindle 17, which is rotatable about a spindle axis, which can be moved in the vertical direction 18, i.e. in the Z-direction, and into which the tools 41 (FIGS. 2 and 4) are clamped, which are used for machining workpieces 39, 40 in a working zone indicated by 20.

In the right upper portion of FIG. 1, a coordinate cross 18 is shown, which indicates the position of the directions 14 and 18.

The workpieces are clamped for machining in a schematically depicted first jig 21, which is mounted on a first carriage 23 so as to be pivotable about an axis 22 extending in the X-direction 14, and which jig 21 can rotate the workpieces 39, 40 about their longitudinal axes for positioning and/or set them in rotation for turning machining in a manner basically known in the art.

The carriage 23 can be moved in a second horizontal direction 24, orthogonal to the first horizontal direction 14, which is also referred to as the Y-axis, and which can also be seen in the coordinate cross 19. In this way, tools 41 clamped in the tool spindle 17 and workpieces 39, 40 clamped in the jig 21 can be moved relative to one another in all three spatial directions 14, 18, 24.

In the illustrated embodiment, a second jig 25 is provided, which is also mounted on a second carriage 27 so that it can be pivoted about an axis 26 extending in the X-direction 14, and which jig 25 can rotate the workpieces 39, 40 about their longitudinal axes for positioning and/or set them in rotation for turning machining. The second carriage 27 can also be moved in the Y-direction 24.

The machine frame 11 supports the tool spindle 17, the jig 21, and the jig 25, if any. Hence, the machine frame 11 may be referred to as a common machine frame 11 for the tool spindle 17 and the at least one jig 21, 25, at least in certain embodiments. Generally, there is provided at least one jig 21, 25. In certain embodiments, there is provided no more than one jig 21, 25. In certain embodiments, there is provided a first jig 21 and a second jig 25. In certain embodiments, there is provided no more than one tool spindle 17.

The tool spindle 17 is assigned a tool magazine 28 which is arranged with its inner end in the working space 20. In the tool magazine 28, several tools 41 are kept in stock in a manner known in the art in so-called magazine places, which can be moved within a tool magazine 28 in such a way that they are available at the inner end for tool changing.

By moving the spindle head 13 in the X-direction 14 and the Z-direction 18, the tool spindle 17 can approach the inner end of the tool magazine 28 and place tools 41 there in empty magazine positions, using the pick-up method, and pick up new tools 41 from equipped magazine positions. That is, the tool spindle 17 itself can pick up tools 41 which are presented or provided at a respective exchange position by the tool magazine 28.

For transporting workpieces into and out of the working space 20, there is provided a workpiece transport device 29, which is arranged on the machine frame, and which is designed as a loading portal 31 that comprises a horizontal beam 32, which extends in the Y-direction 24, and which is supported on the machine frame 11 via a post 33.

Figure 2:
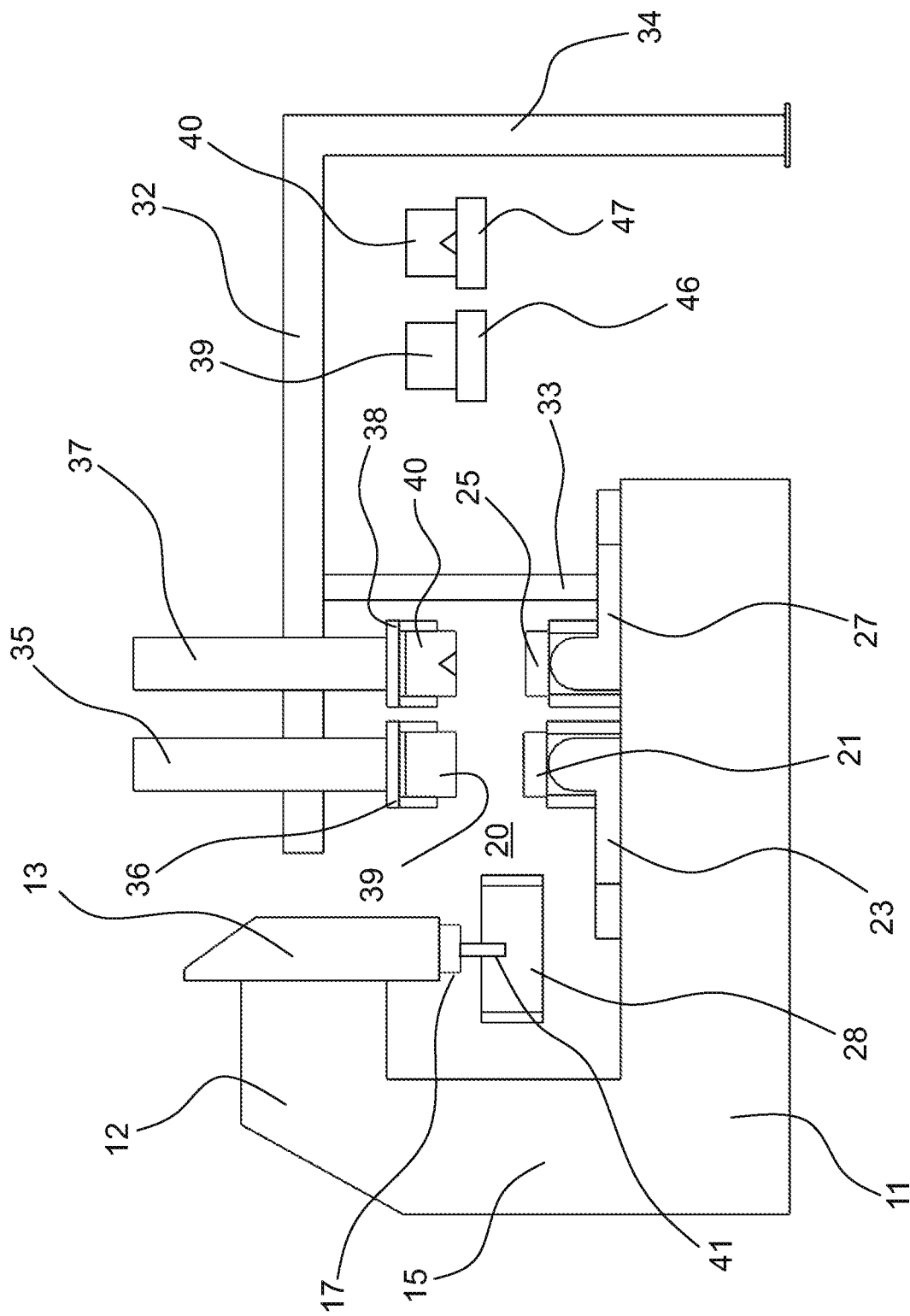
FIG. 2 is a schematic side view of the machine tool of FIG. 1, seen in X-direction.

For stability reasons, it may be necessary to support the beam 32 with a second post 34, which may also be located on the machine frame 11 or—as shown in FIGS. 1 and 2—on the hall floor adjacent to the machine tool 10.

On the beam 32, there is mounted a first gripper unit 35 that is mounted movably in the Y-direction, which first gripper unit 35 comprises a workpiece gripper 36 that is mounted movably in the Z-direction 14.

In an exemplary embodiment, on the beam 32, there is mounted a second gripper unit 37 that is mounted movably in the Y-direction, which second gripper unit 37 comprises a second workpiece gripper 38 that is mounted movably in the Z-direction.

In the illustrated embodiment, the workpiece gripper 36 has gripped an unmachined workpiece 39, which is to be inserted next into the first jig 21, while the workpiece gripper 38 has gripped a machined workpiece 40, which it has just removed from the second jig 25.

Figure 3:
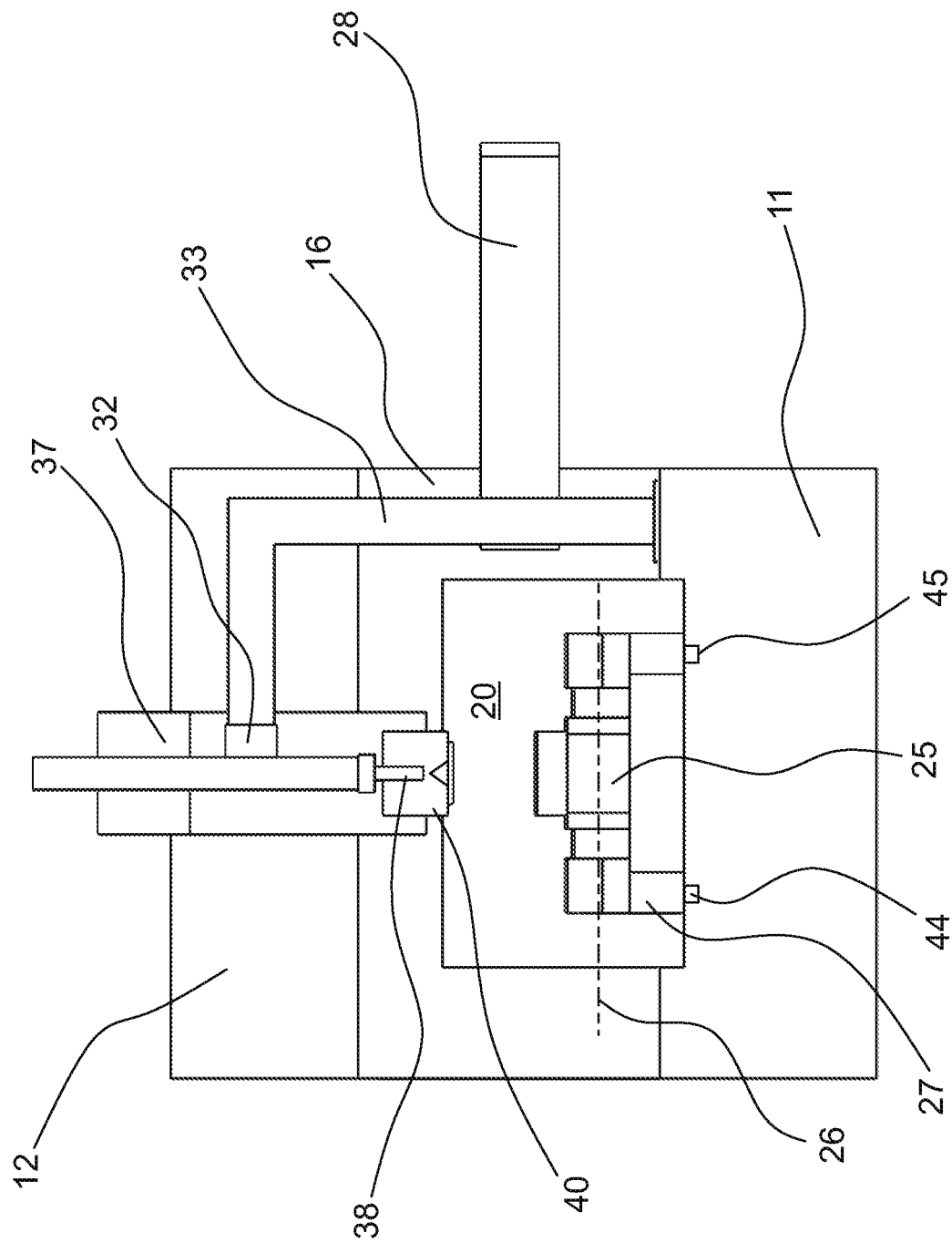
FIG. 3 is a schematic side view of the machine tool of FIG. 1, seen in Y-direction.

FIG. 2 shows a side view of the machine tool 10 from FIG. 1, seen along the X-direction 14 and FIG. 3 shows a side view of the machine tool 10 from FIG. 1, seen along the Y-direction 24.

FIG. 3 shows two guides 44, 45 for the two carriages 23, 27 on which they can be moved in Y-direction 24. Both carriages 23, 27 thus run on the same guides 44, 45.

FIG. 2 also shows a conveyor belt 46 for workpieces 39 still to be machined and a conveyor belt 47 for workpieces 40 already finished. Needless to say, also other transfer devices than the conveyor belts 46, 47 may be used.

A workpiece 39 clamped in the first jig 21 and brought into the working zone 20 by the conveyor belt 46 with the aid of the loading portal 31 is machined with the tool 41 clamped in the tool spindle 17 until all sides and surfaces protruding from jig 21 have been machined. To that end, the jig 21 is moved in the Y-direction 24 and, if necessary, pivoted about the axis 22. In addition, the tool spindle 17 is moved in the X- and Z-axes.

When the partial machining of the workpiece 39 is finished, the jigs 21, 25 are pivoted about their axes 22, 26 so that their tool clamping devices, which are not shown in more detail, are facing one another. Then the second jig 25 moves towards the first jig 21 and/or the first jig 21 moves towards the second jig 25, whereupon the workpiece 39 is transferred to the second jig 25, where it is provided as a partially machined workpiece for further machining.

By moving the second jig 25 in the Y-direction 24 and/or pivoting the second jig 25 about the axis 26, and moving the tool spindle 17 in the X- and Z-axis, all sides and surfaces not yet machined can be finished until a finished workpiece 40 is present in the second jig 25.

This finished workpiece 40 is now gripped by the second gripper unit 37, unloaded from the working zone 20 and deposited on the conveyor belt 47, while the first gripper unit 35 inserts a new workpiece 39 into the second jig 25.

The new machine tool may also only be equipped with the first jig 21 and the first gripper unit 35. In this case, the finished workpiece 40 is first deposited by the gripper unit 35 on the conveyor belt 47 before it can pick up a new workpiece 39 from the conveyor belt 46 and insert it into the first jig 21. Between the end of machining a workpiece 40 and the start of machining a new workpiece 39, the gripper unit 35 must therefore move out of the working space 20 and back into it again.

If necessary, the partially machined workpiece 39 can be removed from jig 21 with a spindle gripper inserted into the tool spindle 17 or with the gripper unit 35, rotated and inserted back into jig 21 in such a way that the sides and surfaces not yet machined are now freely accessible and can be finished.

If only one gripper unit 35 but two jigs 21, 25 are provided, the partially machined workpiece 39—as described above—can be transferred between jigs 21, 25. The gripper unit 35 does not have to leave the working zone 20 between the end of machining a present workpiece 40 and the start of machining a new workpiece 39, since it can insert a new workpiece 39 from the conveyor belt 46 into one of the two jigs 21, 25 and then, so to say, take a machined workpiece 40 out of the other jig 25, 21 and out of the working zone 20 on the way back.

If two gripper units 35, 37 but only one jig 21 are provided, one of the gripper units 35, 37 can move into the working zone 20 with a new workpiece 39 and place it immediately in the jig 21 after the other gripper unit 37, 35 had removed the finished workpiece 40 from the jig 21.

If necessary, a partially machined workpiece 39 must be removed from jig 21 again with a spindle gripper or with one of the gripper units 35, 37, rotated and inserted into the jig 21 in such a way that the sides and surfaces not yet machined are freely accessible and can be finished.

Figure 4:
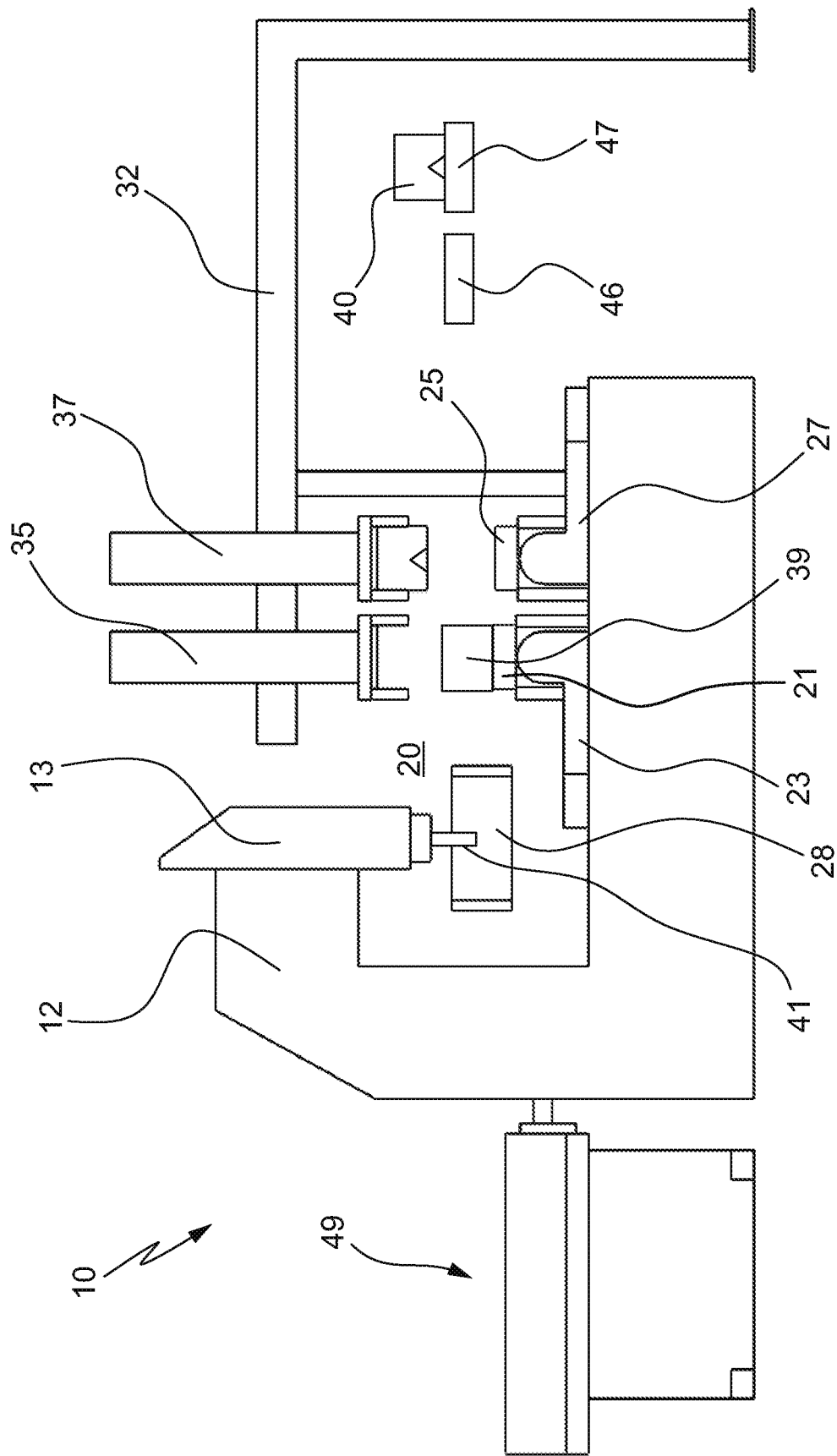
FIG. 4 is a view illustrating another exemplary embodiment of a machine tool that is provided with a bar feeder, wherein the view orientation of FIG. 4 is similar to that of FIG. 2.

As an alternative to the loading portal 31, the transport of unmachined workpieces 39 into the working zone 20 can also be carried out with a bar feeder 49, as shown in FIG. 4 in Y-direction 24 in the left of the machine tool 10. From the bar feeder 49, workpiece bars are pushed into the working zone 20 and clamped with their free end in the first jig 21, which is moved to the far left under the portal beam 12, which first jig 21 was pivoted about the axis 22 so that it faces the bar feeder 49.

The clamped front end of the workpiece bar is then either first separated from the rest of the workpiece bar and further machined as an unmachined workpiece. Depending on whether one jig 21 or two jigs 21, 25 are present, the workpiece 39 is then machined and unloaded as described above.

It is also possible to machine the free end of the workpiece bar while it is still connected to the workpiece bar. Then two jigs 21, 25 are required.

The workpiece bar is thus picked up in the first jig 21 and pivoted and moved as a whole, while its free end is machined as a workpiece 39. Then the two jigs 21, 25 are pivoted towards each other and the free end of the workpiece bar is clamped in the second jig 25. Then the free end is cut off from the remaining workpiece bar and finished as a partially machined workpiece 39 in the second jig 25. The free end of the workpiece bar remaining in the first jig 21 is again machined while it is still connected to the workpiece bar.

When the workpiece 39 is finished, it is either in the first jig 21 or in the second jig 25. From there, the finished workpiece 40 is removed with the first gripper unit 35 and placed on the conveyor belt 47.

If the machine tool 10 is used in this way, the second gripper unit 37 and the conveyor belt 46 are not required, and the second jig 25 may not be required either. However, the machine tool may though be provided with these components individually and in combination, as shown in FIG. 4, so that it can also be used flexibly also for other machining operations.

Figure 5:
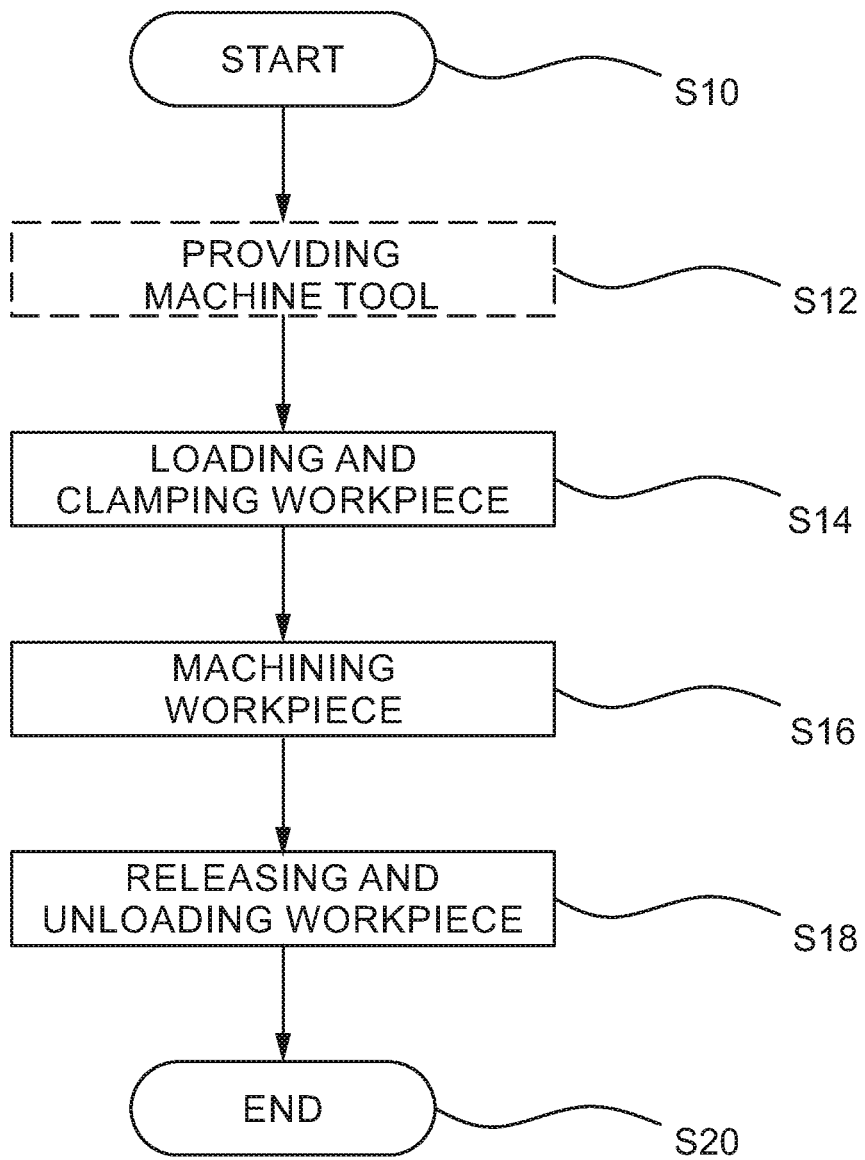
FIG. 5 is a schematic block diagram illustrating an exemplary embodiment of a method of machining workpieces.

With reference to FIG. 5, a simplified schematic block diagram is used to illustrate and explain in more detail an exemplary embodiment of a method for machining workpieces. In certain embodiments, the method makes use of the machine tool in accordance with at least one embodiment as discussed herein. The method begins at a starting step S10.

The following, optional step S12 relates to the provision of a respective machine tool. In certain embodiments, the machine tool is arranged in accordance with the present disclosure. The machine tool comprises a tool spindle, at least one fixture or jig, and a workpiece transport/transfer device.

In a subsequent step S14, the workpiece is loaded. This may involve a transfer via the workpiece transport device, and also a clamping of the workpiece in the at least one jig.

In a subsequent step S16, the workpiece is processed and machined. To this end, a machining tool supported by the tool spindle engages the workpiece. In an exemplary embodiment, the step S16 involves a multi-side machining of the workpiece. To this end, in certain embodiments, two jigs are provided so that the workpiece can be transferred therebetween, directly or mediately, and clamped in different orientations. It is also possible to make use of the tool spindle to grip the workpiece, move it away from the jig, and to claim it again in another orientation at the jig. It is also possible to make use of the workpiece transport device to transfer a workpiece between two jigs and/or to place and clamp the workpiece in different orientations at the very same jig.

In a further step S18, the workpiece is unloaded. To this end, the workpiece is released from its clamped state and received and moved by the workpiece transport device again. Since in certain embodiments two jigs are provided, and since in certain embodiments the workpiece transport device is provided with two gripper units, there are several options to accelerate the workpiece exchange.

It is to be understood that the steps S14 to S18 may take place simultaneously, or at least may overlap one another, when more than one workpiece is processed in accordance with the illustrated embodiment of method. In particular when two jigs and/or two gripper units are provided, then an unmachined workpiece may already approach its machining position during machining of a previous workpiece, and/or a machined workpiece may already be released and (partially) removed while the new unmachined workpiece is approaching.

In the illustrated embodiment, the method concludes with a step S20. Needless to say, to machine a plurality of workpieces, the steps of the method may be performed and executed several/multiple times.

What is claimed is:

1. A machine tool, comprising:
   at least one vertically aligned tool spindle,
   two jigs arranged on respective carriers on a machine frame and configured to support workpieces to be machined,
   a machine frame that supports the tool spindle and the jig, and
   a workpiece transport device,
   wherein the at least one tool spindle is configured to accommodate tools,
   wherein the at least one tool spindle is movable in a vertical direction and in a first horizontal direction orthogonal to the vertical direction,
   wherein the jigs are movable in a second horizontal direction orthogonal to the first horizontal direction and are configured to bring the workpieces into contact with the tools,
   wherein the workpiece transport device is arranged on the machine frame, and
   wherein the workpiece transport device is adapted to perform at least one of introducing unmachined workpieces into at least one of the jigs and removing machined workpieces from least one of the jigs,
   wherein the workpiece transport device comprises an overhead beam that extends in the second horizontal direction, wherein a first gripper unit and a second gripper unit are mounted below the beam, wherein the first gripper unit and the second gripper unit each are movable in the second horizontal direction and each provided with a workpiece gripper, and wherein the respective workpiece grippers are movable in the vertical direction.

2. The machine tool of claim 1, wherein no more than one tool spindle is provided.

3. The machine tool of claim 1, wherein the workpiece transport device is adapted to perform introducing unmachined workpieces into at least one of the jigs and removing machined workpieces from at least one of the jigs.

4. The machine tool of claim 1, further comprising a fixed portal beam extending in the first horizontal direction, wherein the fixed portal beam is arranged on the machine frame, and wherein the tool spindle is mounted on the fixed portal beam so as to be movable in the vertical direction and the first horizontal direction.

5. The machine tool of claim 1, further comprising a guide that is arranged on the machine frame, wherein the guide extends in the second horizontal direction, and wherein the two jigs are movably mounted on the guide.

6. The machine tool of claim 1, wherein at least one of the two jigs is pivotable about a horizontal axis that extends in the first horizontal direction.

7. The machine tool of claim 1, further comprising at least one stationary tool magazine.

8. The machine tool of claim 1, wherein the beam is supported on the machine frame via at least one post.

9. The machine tool of claim 1, wherein the beam is supported via at least one post in the second horizontal direction next to the machine frame.

10. A method for machining workpieces, the method comprising:
   a) gripping an unmachined workpiece with a first workpiece gripper, introducing the workpiece into a first jig, and clamping the workpiece in the first jig,
   b) machining the workpiece with at least one tool this is clamped in a tool spindle, wherein the workpiece clamped in the first jig is transferred, after partial machining by the at least one tool, to a second jig within the machine tool, where the workpiece is clamped and finished, wherein the workpiece clamped in the first jig is transferred directly from the first jig to the second jig, and includes pivoting both jigs about a respective first horizontal axis and bringing both jigs towards one another along a second horizontal axis,
   c) removing the finished workpiece with the workpiece gripper using either the first or second workpiece gripper, and
   introducing an unmachined workpiece into the first jig with the workpiece gripper not used in step c).

11. The method of claim 10, wherein in step b) the workpiece clamped in the first jig is transferred to the second jig the first workpiece gripper.

12. The method of claim 10, wherein subsequently one of the two workpiece gripper deposits the machined workpiece, and wherein the other one of the two workpiece grippers receives an unmachined workpiece.

13. A method for machining workpieces, the method comprising the steps of:
   providing a machine tool including:
      at least one vertically aligned tool spindle,
      two jigs arranged on respective carriers on a machine frame and configured to support workpieces to be machined,
      a machine frame that supports the tool spindle and the jigs, and
      a workpiece transport device,
      wherein the at least one tool spindle is configured to accommodate tools,
      wherein the at least one tool spindle is movable in a vertical direction and in a first horizontal direction orthogonal to the vertical direction,
      wherein the jigs are movable in a second horizontal direction orthogonal to the first horizontal direction and are configured to bring the workpieces into contact with the tools,
      wherein the workpiece transport device is arranged on the machine frame, and
      wherein the workpiece transport device is adapted to perform at least one of introducing unmachined workpieces into at least one of the jigs and removing machined workpieces from at least one of the jigs,
      wherein the workpiece transport device comprises an overhead beam that extends in the second horizontal direction, wherein a first gripper unit and a second gripper unit are mounted below the beam, wherein the first gripper unit and the second gripper unit each are movable in the second horizontal direction and each provided with a workpiece gripper, and wherein the respective workpiece grippers are movable in the vertical direction,
   gripping an unmachined workpiece with one of the workpiece grippers of the workpiece transport device, introducing the workpiece into a first jig, and clamping the workpiece in the first jig,
   machining the workpiece with one or more tools that are clamped in the tool spindle, and
   removing the finished workpiece with one of the workpiece grippers.

14. The method of claim 13, wherein the workpiece clamped in the first jig is transferred, after partial machining, to the second jig within the machine tool, where the workpiece is clamped and finished.

* * * * *